(12) United States Patent
Joseph et al.

(10) Patent No.: US 9,507,668 B2
(45) Date of Patent: Nov. 29, 2016

(54) SYSTEM AND METHOD FOR IMPLEMENTING A BLOCK-BASED BACKUP RESTART

(71) Applicant: NetApp. Inc., Sunnyvale, CA (US)

(72) Inventors: James Namboorikandathil Joseph, Bangalore (IN); Manoj Kumar Venkatachary Sundararajan, Chennai (IN); Ravi K. Budhia, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 132 days.

(21) Appl. No.: 14/528,340

(22) Filed: Oct. 30, 2014

(65) Prior Publication Data

US 2016/0124814 A1    May 5, 2016

(51) Int. Cl.
*G06F 11/00* (2006.01)
*G06F 11/14* (2006.01)

(52) U.S. Cl.
CPC ....... *G06F 11/1438* (2013.01); *G06F 11/1458* (2013.01); *G06F 11/1464* (2013.01); *G06F 2201/84* (2013.01)

(58) Field of Classification Search
USPC .......................................................... 714/20
See application file for complete search history.

(56) References Cited

U.S. PATENT DOCUMENTS

| | | | | |
|---|---|---|---|---|
| 7,069,401 | B1* | 6/2006 | Noonan | G06F 11/1461 707/999.202 |
| 2009/0249119 | A1* | 10/2009 | Sethumadhavan | G06F 11/1469 714/15 |
| 2009/0292947 | A1* | 11/2009 | Ganesh | G06F 11/1474 714/16 |
| 2011/0055625 | A1* | 3/2011 | Honda | G06F 11/141 714/6.11 |
| 2013/0080823 | A1* | 3/2013 | Roth | G06F 11/2023 714/4.1 |
| 2015/0355976 | A1* | 12/2015 | Carey | G06F 11/1441 714/23 |

* cited by examiner

*Primary Examiner* — Sarai Butler
(74) *Attorney, Agent, or Firm* — Cooper Legal Group, LLC

(57) ABSTRACT

A system and method for block-based restarts are described. A data storage system interfaces with one or more nodes of a network file system on which a volume is provided in order to read data stored on the volume on a block-by-block basis. Backup data sets capable of recreating the data on the volume are generated from the data blocks read from the volume. The system can interface with a backup memory resource and write the backup data sets to the backup memory resource in a sequential order. As the backup data sets are generated and written to the backup memory resource, restart checkpoints for the data set are also regularly generated and stored for use in restarting the backup process in the event of a recoverable failure in the transfer.

20 Claims, 7 Drawing Sheets

SYSTEM AND METHOD FOR IMPLEMENTING A BLOCK-BASED BACKUP RESTART

TECHNICAL FIELD

Examples described herein relate to data storage systems, and more specifically, to a system and method for implementing a block-based backup restart.

BACKGROUND

The network data management protocol (NDMP) specifies a common architecture for the backup of network file servers and enables the creation of a common agent that a centralized program can use to back up data on file servers running on different platforms. By separating the data path from the control path, NDMP minimizes demands on network resources and enables localized backups and disaster recovery. With NDMP, heterogeneous network file servers can communicate directly to a network-attached tape device for backup or recovery operations. Without NDMP, administrators must remotely mount the network-attached storage (NAS) volumes on their server and back up or restore the files to directly attached tape backup and tape library devices.

Tape devices are one conventional approach for enabling recording of block-based backup data. A tape device provides sequential access storage, unlike a disk drive, which provides random access storage. A disk drive can move to any position on the disk in a few milliseconds, but a tape device must physically wind tape between reels to read any one particular piece of data. In tape devices, a disadvantageous effect termed "shoe-shining" occurs during read/write if the data transfer stops or its rate falls below the minimum threshold at which the tape drive heads were designed to transfer data to or from a continuously running tape. In this situation, the modern fast-running tape drive is unable to stop the tape instantly. Instead, the drive must decelerate and stop the tape, rewind it a short distance, restart it, position back to the point at which streaming stopped and then resume the operation. If the condition repeats, the resulting back-and-forth tape motion resembles that of shining shoes with a cloth. Shoe-shining decreases the attainable data transfer rate, drive and tape life, and tape capacity.

DETAILED DESCRIPTION

Figure 1:
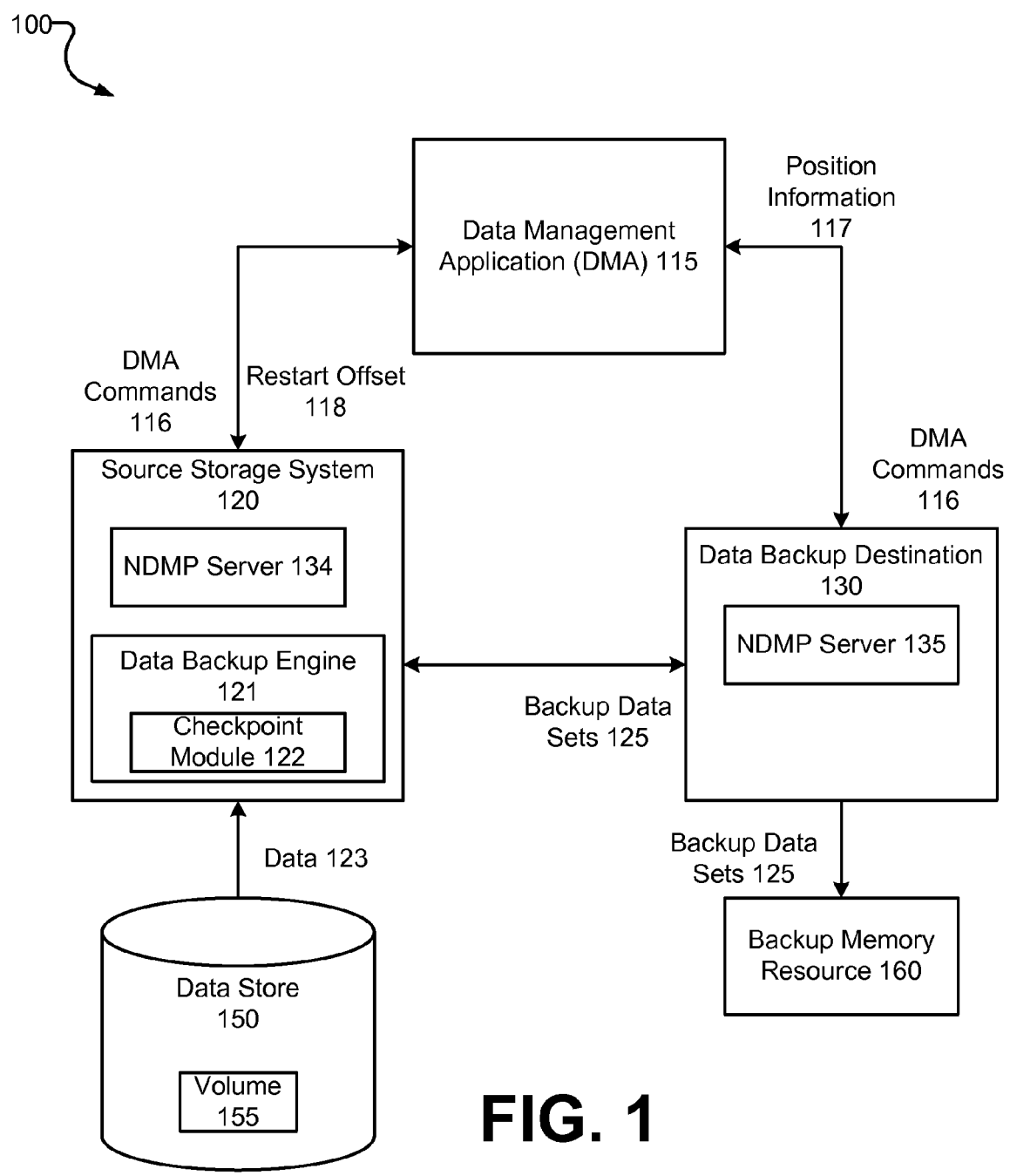
FIG. 1 illustrates an example data backup system for implementing a block-based backup restart, in accordance with some aspects.

Examples described herein include a computer system to backup data from a network file system at the physical block level, with the capability to efficiently restart the backup process from a point of failure.

In an aspect, a data storage system performs operations that include interfacing with one or more nodes of a network file system on which a volume is provided in order to read data stored on one or more volumes of the network file system. Rather than reading file-by-file, the system reads from the volume on a block-by-block basis. Backup data sets capable of recreating the data on the volume are generated from the data blocks read from the volume. In contrast to conventional approaches, when the backup process experiences a failure, examples such as described below enable for a backup system to restart the backup read process from a specified block on the volume and restart the backup write process at a particular location in the backup resource.

In more detail, a block-based backup system is capable of interfacing with a backup memory resource in order to write the backup data sets to the backup memory resource in a sequential order. When a failure is experienced by the backup system, the point of failure can be correlated to a physical or logical location that is structured linearly in accordance with the sequential order. In one aspect, there is only one node and one data set backed up from the volume. In other aspects, the volume is distributed across multiple nodes over a network and each node generates its own backup data set which can be combined with the other nodes' backup data sets to recreate the data stored on the volume.

In one aspect, a backup memory resource is a tape device or tape library in which data is read and written to in a sequential order in accordance with a linear physical and logical structure of the resource. In other aspects, the backup memory resource is a cloud storage platform located on a remote host and the data sets are transmitted across a network in the sequential order in accordance with a queue or other physical and logical structure of resources for transferring data to the platform across a network.

As the backup data sets are generated and written to the backup memory resource, restart checkpoints for each data set are also regularly generated. In one aspect, these checkpoints are created after a fixed period of time (e.g., every 30 seconds). In other aspects, checkpoints can be created after a specified number of blocks have been read from the volume. These checkpoints can then be stored at a checkpoint location such as in memory or persistent storage.

During the data backup process, the system can detect various failures, both recoverable and non-recoverable. If a failure in the backup session is recoverable, the system can attempt to trigger a backup restart either with the help of a data management application or unbeknownst to the data management application depending on the type of failure.

In one method of operation, a system interfaces with a network file system on which one or more nodes of a volume (or set of multiple volumes) is provided in order to retrieve stored checkpoints for backup data sets. In some variations, the checkpoints can be stored in checkpoint locations provided with the volumes on which the backup is performed. Rather than generating backup data sets from the starting block of the volume, the nodes can restart the backup session and generate backup data sets beginning at a block identified in the stored checkpoint. In some aspects, when there are multiple checkpoints stored at the checkpoint location, the checkpoint referring to the earliest block is used. In other aspects, the checkpoint referring to a block which is closest to but less than a specified restart offset is used.

In another method of operation, upon detecting a failure in the backup session requiring a backup restart, the system can signal the backup memory resource to return to a most recent consistent position in the ordered sequence prior to the failure. The system can identify a restart offset corresponding to the most recent consistent position in the ordered sequence then select a restart checkpoint based on the restart offset. Using the restart checkpoint, the system can generate further backup data sets from the read data beginning at a block identified by the restart checkpoint and interface with the backup memory resource in order to sequentially write the further backup data sets to the backup memory resource.

By utilizing a block-based backup process, data can be backed up more quickly compared to a logical directory-based backup. In addition, special volume settings and configurations such as deduplication can be backed up. However, many conventional backup restart features are not implemented with block-based backup processes. NDMP allows data to be written directly to a network-attached backup device, such as a tape library, but these backup devices may not be intended to host applications such as conventional backup software agents and clients, which can result in failures necessitating a complete restart of the backup process. Since data backups are often very large, restarting from the beginning in the event of failure can be costly. In addition, writing to the same tape device repeatedly reduces its lifespan, and transferring data over a network can be expensive in terms of bandwidth use. Among other benefits, creating checkpoints throughout the backup session and reading the checkpoints in the event of a failure, the benefits of a restartable backup process can be used with block-based backups.

The term "block" and variants thereof in computing refer to a sequence of bytes or bits, usually containing some whole number of records, having a maximum length known as the block size. Blocked data is normally stored in a data buffer and read or written a whole block at a time. Blocking reduces the overhead and speeds up the handling of the data-stream. For some devices such as magnetic tape and CKD disk devices, blocking reduces the amount of external storage required for the data. Blocking is almost universally employed when storing data to magnetic tape, rotating media such as floppy disks, hard disks, optical discs, and NAND flash memory. Most file systems are based on a block device, which is a level of abstraction for the hardware responsible for storing and retrieving specified blocks of data.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried out and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs.

System Overview

FIG. 1 illustrates an example data backup system 100 for block-based backup restarts, in accordance with some aspects. The data backup system 100 includes Network Data Management Protocol (NDMP) data management application (DMA) 115 in communication over a network with a source storage system 120 and a data backup destination 130. Data store 150, attached to source storage system 120, can be any type of physical memory resource such as a hard disk drive or storage area network (SAN) on which one or more volumes 155 are provided. In this context, a volume is a single accessible storage area within a file system, accessible using an operating system's logical interface. In one aspect, volume 155 is stored in its entirety on data store 150. In other aspects, volume 155 is distributed across multiple data stores 150 and accessed by more than one source storage system 120. In either case, when NDMP server 134 running on source storage system 120 receives a DMA command 116 to perform a backup operation for volume 155, data backup engine 121 retrieves data 123 from the data store 150 at the physical block level. In some aspects, data backup engine 121 sends backup data sets 125 to the data backup destination 130. DMA commands 116 received by an NDMP server 135 at the data backup destination 130 direct the backup data sets 125 to be written to a backup memory resource 160 (e.g., a tape device).

Data management application 115 communicates over a network with the source storage system 120 and data backup destination 130. NDMP provides an open standard for network-based backup of network-attached storage (NAS) devices such as source storage system 120 and minimizes coding needed for different applications by providing standard commands for backing up and restoring file servers. NDMP increases the speed and efficiency of NAS data protection because data can bypass backup servers and be written directly to secondary storage at a data backup destination 130.

NDMP addresses a problem caused by the particular nature of network-attached storage devices such as source storage system 120. These devices are not connected to networks through a central server, so they include their own operating systems. Because NAS devices are dedicated file servers, they aren't intended to host data management applications such as backup software agents and clients. Consequently, administrators need to mount every NAS volume by either the Network File System (NFS) or Common Internet File System (CIFS) from a network server that does host a backup software agent. However, this cumbersome method causes an increase in network traffic and a resulting degradation of performance. Therefore, NDMP uses a common data format that is written to and read from the drivers for the various devices, such as source storage system 120 and data backup destination 130. In this manner, data management application 115 can send DMA commands 116 to direct a data backup process between the source storage system 120 and the data backup destination 130 without needing to mount volume 155 or backup memory resource 160.

Data management application 115 communicates with the source storage system 120 and the data backup destination 130 to control backup, recovery, and other types of data transfer between primary and secondary storage. In some aspects, source storage system 120 and data backup destination 130 can be the same physical system, and data store 150 and backup memory resource 160 can both be connected to it. In other aspects, the source and destination are physically separated with data store 150 connected to source storage system 120 and backup memory resource 160 connected to data backup destination 130. Data backup destination 130 can be a secondary storage system with its own operating system and an NDMP server 135, or in another aspect, data backup destination 130 can be a simple NDMP-compliant device.

In one example, backup memory resource 160 is a tape device, and data management application 115 opens the tape device and positions its writing mechanism to the appropriate location for backing up data. Data management application 115 can establish a connection between source storage system 120 and the NDMP server 135 of the data backup destination 130. The data management application 115 can specify the volume to be backed up (e.g., volume 155) to the data backup engine 121 and trigger the backup process to begin.

During the data backup process, data backup engine 121 sends backup data sets 125 from the source storage system 120 to the data backup destination 130. In one aspect, at programmed intervals while the backup process is ongoing, a checkpoint module 122 generates checkpoints representing the latest block numbers read from the volume 155. In other aspects, the checkpoints identify a virtual block number which the data backup engine 121 can use to map to a physical block number on volume 155. For example, the programmed interval can be every 30 seconds. In some aspects, checkpoints are stored with the source storage system 120 itself.

In one mode of operation, in the event of a failure in the data backup process, the checkpoint module 122 can retrieve stored checkpoints for use in restarting the data backup at or near the point of failure rather than having to restart from the beginning. In one aspect, checkpoints are saved in non-volatile memory of the data backup destination 130. Alternatively, checkpoints can be saved on physical media such as a checkpoint-file associated with volume 155 being backed up from the source storage system. The checkpoint file can hold multiple checkpoints along with the data offset associated with each checkpoint.

In another mode of operation, data management application 115 can control the restart process in the event of failure using position information 117, which may represent a mapping of positions in the data backup stream to positions in the backup memory resource 160 where corresponding data from the stream is written. After the failure, the data management application 115 can reestablish a connection between the source storage system 120 and the NDMP server 135 at data backup destination 130. Once the connection has been reestablished, the data management application 115 can signal the backup memory resource 160 to reposition itself to the last consistent position recorded, which may represent the last known good write before the failure occurred. In one aspect, this involves repositioning the writing mechanism of a magnetic tape in a tape device. In other aspects, repositioning refers to a sequential stream of bytes being sent over a network, for example to a cloud storage system.

Once repositioned, the data management application 115 can identify a data restart offset which corresponds to the identified last consistent position of the backup memory resource 160. This restart offset 118 and a backup context identifying the backup session can be sent to the source storage system 120 along with a DMA command 116 to restart the backup session.

Data backup engine 121 receives the restart backup request and looks up a checkpoint file using the restart offset 118 provided by the data management application 115. In one aspect, this lookup is performed on a file on the source storage system 120 that contains a table mapping data offsets to checkpoints for each backup session. The data backup engine 121 selects a checkpoint with an offset that is closest to but less than the reset offset 118 to use as a basis for restarting the backup session.

In one aspect, checkpoints include an id, block number, progress, unique transfer id, and data containing checkpoint information. The id corresponds to a common identifier for all checkpoints to be used by the operating system and components to identify the packet as a checkpoint. Block number references the latest block number on volume 155 which has been read. The block number can be a virtual block number used by data backup engine 121 to map to a physical block number on volume 155. Progress represents the state of completion of the backup process, such as a percentage of total blocks on volume 155 that have been read and transferred or alternatively, a number of bytes transferred. The unique transfer id is different for all checkpoints in the transfer and therefore uniquely identifies each checkpoint.

A data backup system 100 may have more constituent elements than depicted in FIG. 1, which has been simplified to highlight relevant details. For example, there can be multiple source storage systems 120, each with an associated backup data set 125, and the volume 155 can be distributed among multiple data stores 150. Similarly, although FIG. 1 presents data backup system 100 in the context of NDMP, data backup system 100 can be implemented independently of NDMP using similar protocols.

Figure 2:
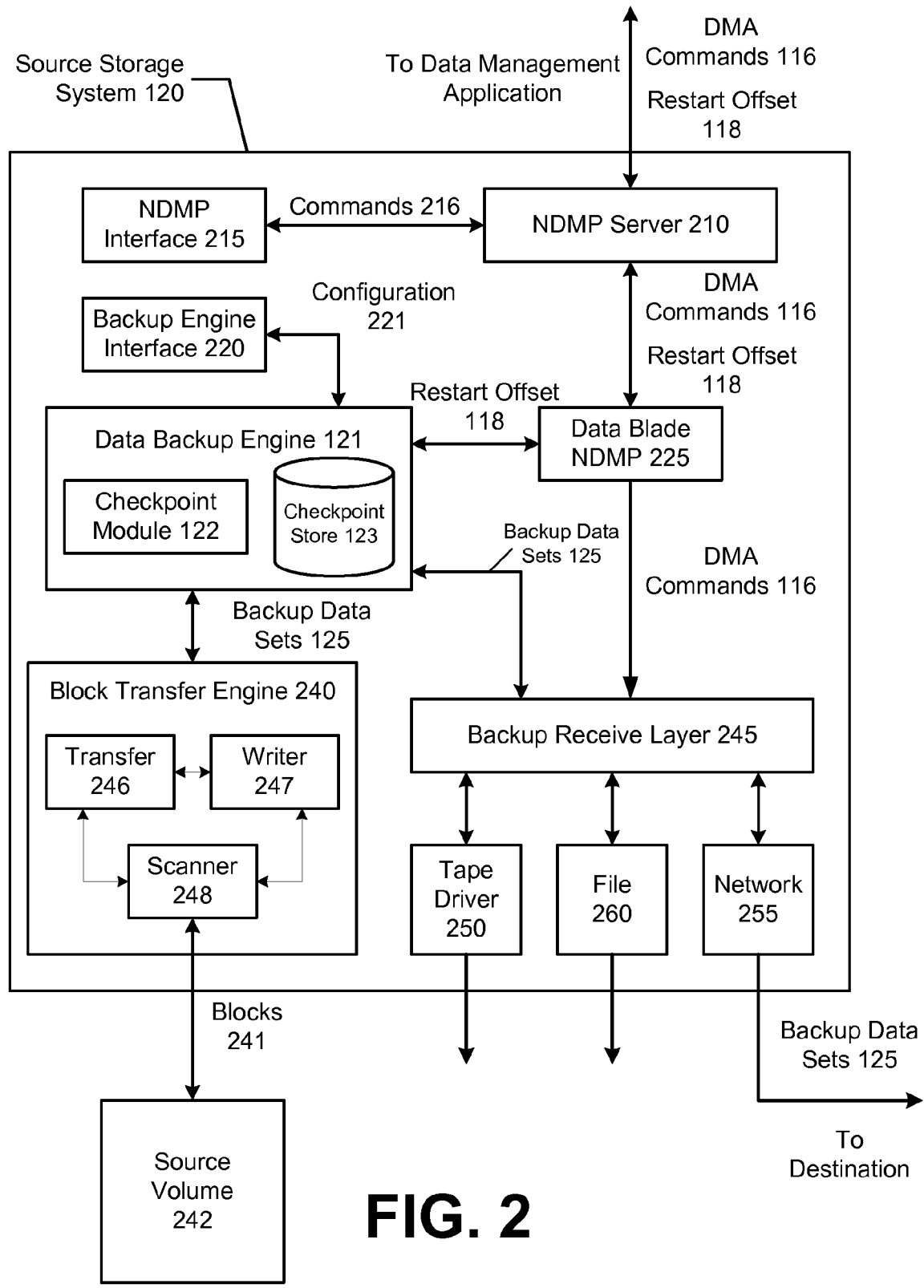
FIG. 2 illustrates an example data storage system operable for backing up data and implementing a block-based backup restart, in accordance with some aspects.

FIG. 2 illustrates an example data storage system, in this case source storage system 120 depicted in FIG. 1, operable for backing up data and implementing block-based backup restarts, in accordance with some aspects. A source storage system 120 can include more components than depicted in FIG. 2, which has been simplified to highlight components that are used in block-based backup restarts, in accordance with some aspects.

Source storage system 120 contains an NDMP server 210 to manage communications between data management application 115 and a data backup destination 130 that operates to store the backup data sets 125. These communications can occur over internal LANs or external networks such as the Internet using a variety of protocols such as TCP/IP.

In some aspects, the NDMP server 210 and an NDMP interface 215 are part of a management blade in the source storage system 120 operating system. The NDMP interface 215 can be a command line interface or a web-based browser interface that allows customers, server administrators, or other personnel to monitor NDMP activity and issue commands 216 to the NDMP server 210. A data blade NDMP 225 controls communications and data flow between the NDMP server 210 in the management blade and the other components of the data blade, such as data backup engine 121, block transfer engine 240, and backup receive layer 245.

The data backup engine 121 is configured to accept backup commands 221 from a backup engine interface 220. For example, a customer can use the backup engine interface 220 to configure and edit configuration 221, which can include technical parameters affecting the backup process. In one aspect, the configuration 221 can include an interval of time or number of blocks transferred before each checkpoint is created.

Backup Receive Layer 245 interfaces with the data backup engine 121 and data blade NDMP 225 to receive DMA commands 116. In some aspects, the backup receive layer 245 is also connected with components that perform different types of backup operations, such as a dump component for logical file-based backups. As illustrated in FIG. 2, backup receive layer 245 can receive backup data sets 125 from data backup engine 125. In one example, backup receive layer 245 takes the backup data sets 125 and sends them through a network 255 to the data backup destination 130. Alternatively, backup data sets 125 can be backed up from an attached volume to a physical storage medium (e.g., a tape device) directly connected to source storage system 120. To handle writing backup data, the backup receive layer 245 interfaces with a number of drivers and other components, such as tape driver 250 for writing to tape devices, network 255 for connection to a remote host (e.g., cloud storage or data backup destination 130), and file 260.

Block transfer engine 240 is a component for taking blocks 241 from a source volume 242 and converting them into backup data sets 125 to be sent to the data backup engine 121. In one aspect, block transfer engine 240 is a NetApp® SnapMirror® transfer engine. Rather than reading files and directories from the volume, block transfer engine 240 operates at the physical block level to read blocks 241 from source volume 242. In one mode of operation, block transfer engine 240 identifies physical blocks on source volume 242 through the use of virtual containers managed by a RAID subsystem, which provides a range of virtual block numbers mapping to physical block numbers.

Block transfer engine 240 replicates the contents of the entire volume, including all snapshot copies, plus all volume attributes verbatim from source volume 242 (primary) to a target (secondary) volume, which can be attached locally to source storage system 120 or attached to the data backup destination 130. In some aspects, block transfer engine 240 finds the used blocks in source volume 242 and converts the changes into Replication Operations (ReplOps) that can be packaged into backup data sets 125 and sent over the network to the data backup destination 130. In some aspects, a ReplOp represents changes to a file system in the form of messages. When replicating one volume to another, ReplOps are applied to the backup volume at the data backup destination 130, therefore reconstructing the volume data. However, in some aspects, data backup engine 121 instead leverages the block transfer engine 240 to create ReplOps and package them into backup data sets 125, which are transferred and themselves written to physical media such as a tape device, thus achieving physical backup. In a further aspect, backup data sets 125 represent marshaled ReplOps packaged into chunks of blocks which can contain a header and checksum to detect corruption. These chunks are only written to the output stream once completely created, and the destination writes the stream to backup memory resource 160 when received. In other aspects, raw data blocks from the source volume 242 themselves can be sent to the data backup destination 130 and written, and these blocks can be used to reconstruct the volume data at a later time.

Figure 3:
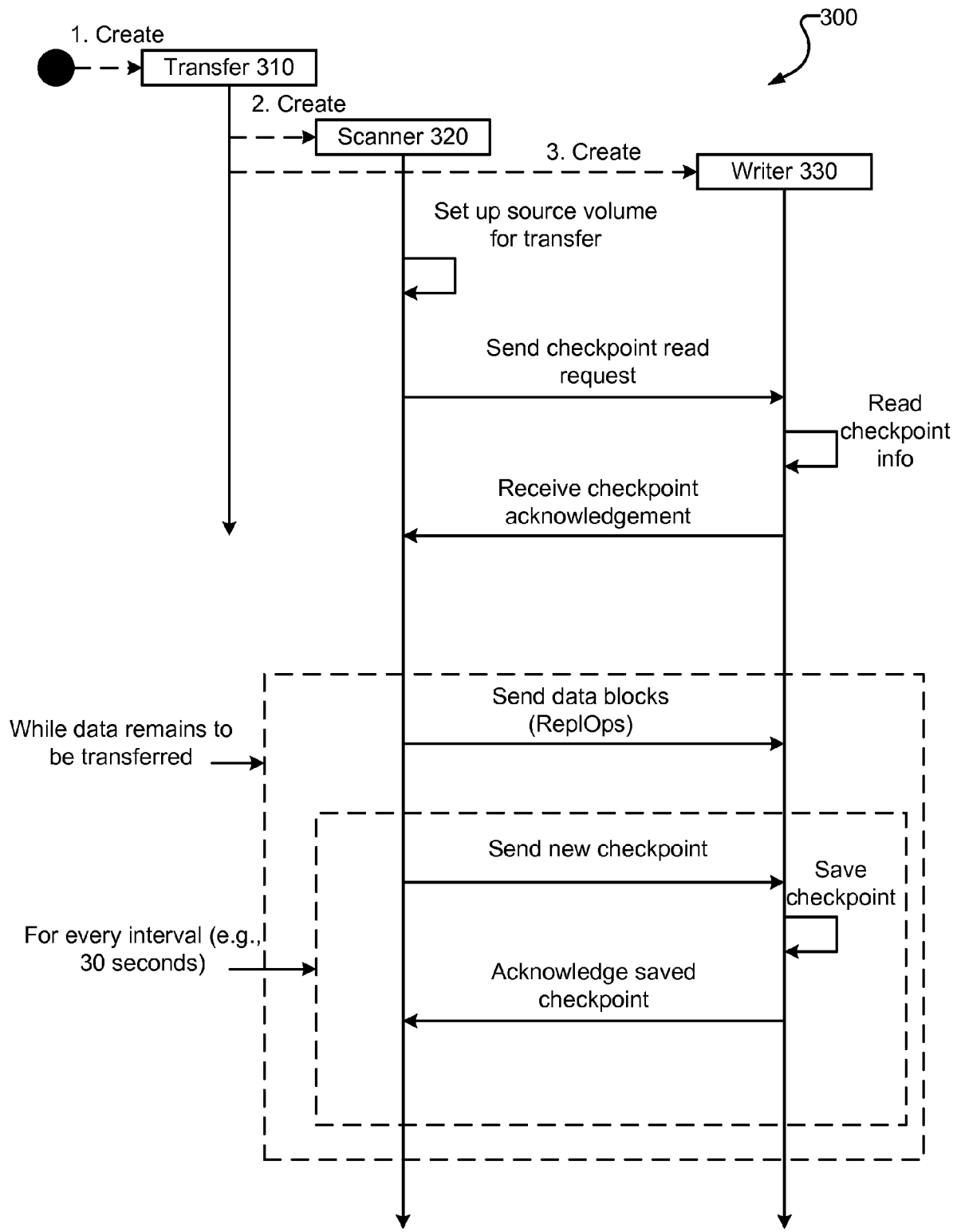
FIG. 3 illustrates an example sequence of operations for transferring backup data with the capability for a block-based backup restart.

In some aspects, block transfer engine 240 executes a transfer 246, writer 247, and scanner 248, whose operations are detailed in FIG. 3. Scanner 248 reads blocks 241 from the source volume 242 and sends ReplOps and created checkpoints to writer 247, which interfaces with data backup engine 121. In one aspect, writer 247 is executed on data backup engine 121 instead of block transfer engine 240. Writer 247 additionally handles checkpoint read requests from scanner 248.

During a future data restore process, the data backup engine 121 can reconstruct the ReplOps read from the physical media and send them to the block transfer engine 240 to reconstruct the volume. In some aspects, the data backup engine 121 only handles physical, block-based backups and therefore does not understand file system formats and cannot recognize files and directories. In these aspects, data backup engine 121 backs up data only at the volume level.

In one aspect, block transfer engine 240 can compress data backup sets 125 to conserve network bandwidth and/or complete a transfer in a shorter amount of time. These compressed backup data sets 125 can then be decompressed at the data backup destination 130 before being written to physical media, or in another aspect, the compressed backup data sets 125 can be written without first being decompressed.

While reading blocks and transferring backup data sets 125, checkpoint module 122 generates checkpoints and stores them in checkpoint store 123 at programmed intervals. For example, the programmed interval can be every 30 seconds or alternatively, a set number of blocks from source volume 242. In one aspect, checkpoint store 123 is located in memory of source storage system 120. In another aspect, checkpoint store 123 can be a persistent storage medium such as a hard disk. In one aspect, checkpoint module 122 is a part of the data backup engine 121. In another aspect, checkpoint module 122 is a part of block transfer engine 240, which uses its scanner 248 to send the checkpoints to data backup engine 121.

FIG. 3 illustrates an example sequence of operation for transferring backup data with the capability for block-based backup restarts. While operations of the sequence 300 are described below as being performed by specific components, modules or systems of the data backup system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 3, a transfer 310 is created through for example, a data backup system 100 as described with FIG. 1. In some aspects, transfer 310 can be created in response to an NMDP backup command received from data management application 115, which can be initiated by a user of data backup system 100 or an automated process. Once the transfer 310 is created, it instantiates a scanner 320 and writer 330. In some aspects, the scanner 320 is an instance of an object executed on block transfer engine 240 as described with FIG. 2, and writer 330 is an instance of an object executed on data backup engine 121. In another aspect, writer 330 is also executed on block transfer engine 240. Transfer 310 can instantiate more instances of objects than just these two, but for the purpose of highlighting relevant details, other objects are omitted.

Once instantiated, scanner 320 sets up the source volume for data transfer. For example, setting up the source volume can include a quiesce operation to render the volume temporarily inactive. In some aspects, the scanner 320 sends a checkpoint read request to the writer 330 at the data backup engine. Writer 330 can then translate the read request into a function invocation to read checkpoint information from the checkpoint location, which may be stored in memory at or written to checkpoint store 123. In the case where transfer 310 is associated with a new backup process, there should not be any stored checkpoint information for the backup. This can lead to writer 330 filling out the checkpoint information with an empty checkpoint. However, when the backup process has been restarted, there should be checkpoint information for writer 330 to read. In either case, the checkpoint information, whether empty or not is returned to the scanner 320 as part of the acknowledgement of receiving the read request.

With the checkpoint information received, the scanner 320 starts scanning the source volume from the block identified in the checkpoint information. In some aspects, when the checkpoint was empty at the checkpoint location, as in the case of a new backup process, the scanner 320 begins at the first block of the source volume. The scanned data blocks can then be packaged as ReplOps and sent to the writer 330 for as long as there are more data blocks on the volume that need to be backed up.

While the data blocks are being transferred, the scanner regularly creates new checkpoints for the backup process through, for example, the checkpoint module 122 illustrated in FIGS. 1 and 2. In one aspect, checkpoints are generated every 30 seconds. Once generated, the new checkpoint is sent to the writer 330, which saves the checkpoint in checkpoint store 123 to use for a restart in case of a backup failure. After saving, the writer 330 acknowledges receipt of the checkpoint. In some aspects, this process is repeated every 30 seconds until the transfer is completed.

Figure 4:
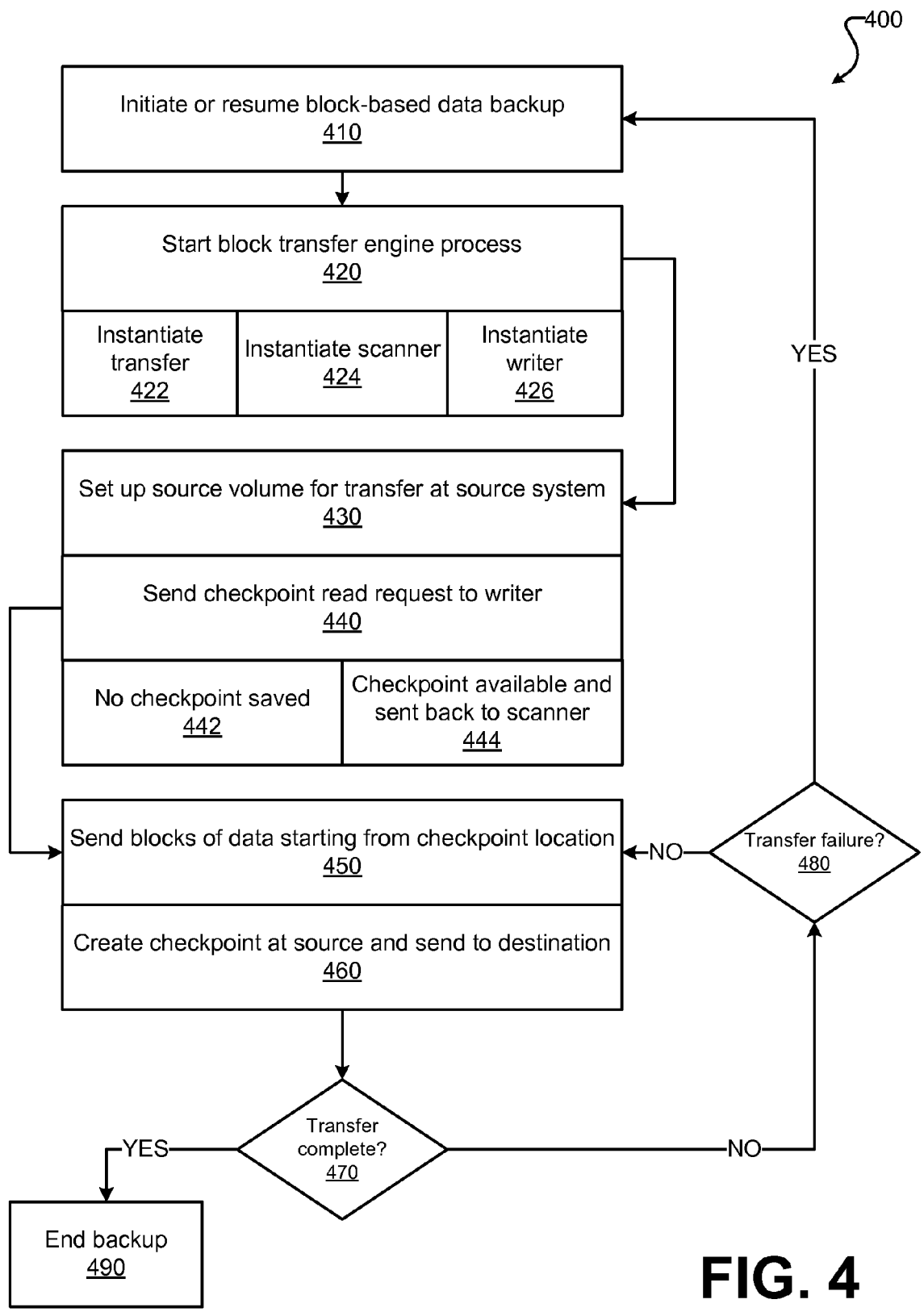
FIG. 4 illustrates an example method of backing up data in a block-based restart environment, in accordance with some aspects.

FIG. 4 illustrates an example method of backing up data in a block-based restart environment, in accordance with some aspects. The method 400 can be implemented, for example, by data backup system 100 as described above with respect to FIG. 1. A block-based data backup process can be initiated by, in one aspect, data management application 115 either from a user or automated process (410). If the process has already transferred some data and is recovering from a failure, it can instead be restarted from a checkpoint without any effect on I/O handles or NDMP connections.

In either case, block transfer engine 121 starts the backup process to transfer blocks of data from a source volume to storage at a backup destination (420). As part of the backup process, an instance of a transfer object is created (422). The transfer instance can then instantiate a scanner at the source storage system 120 which can manage reading data, packaging data, and handling checkpoint creation during the process (424). Transfer instance also instantiates a writer which delivers the ReplOps/Data to the data backup engine 121, which further processes and writes to the destination through backup receive layer 245, for example to tape, a file, or over a network to the data backup destination or remote host.

In some aspects, the scanner sets up the source volume for transfer at the source storage system 120 (430). Once the source volume is ready, the scanner sends a checkpoint read request to the writer (440). The writer interprets the checkpoint read request as a ReadCheckpoint( ) function invocation and looks in the checkpoint location for any checkpoints associated with the transfer. If the backup process is new or has to begin from the first block due to an unrecoverable error, the writer should not have any checkpoint information saved associated with the transfer (442). However, if the backup process failed due to a recoverable error, there can be checkpoint information available at the checkpoint destination which the writer can read and return to the scanner along with an acknowledgement of receiving the read request (444).

Once the scanner receives the checkpoint information from the writer, the scanner begins reading blocks of data from the source volume starting at the block identified in the checkpoint (450). While the transfer is ongoing, the scanner creates checkpoints at specified intervals (e.g., every 30 seconds) and sends them to the writer to be delivered to the data backup engine, which stores checkpoints in checkpoint store 123 in memory or in persistent storage.

In some aspects, a determination is made as to whether the transfer is complete (470). If all blocks on the source volume have been transferred, the method 400 ends (490). Otherwise, if there are still data blocks remaining to be read and transferred, the method 400 continues sending data and checkpoints. However, if a restartable failure occurs during the transfer (480), the transfer can be restarted with the same destination using the saved checkpoints as reference points. If there are multiple checkpoints saved at the destination, the oldest one may be used to ensure data integrity. In some aspects, the source storage system 120 can restart the transfer without data management application 115 and data backup destination 130 being made aware of the failure. In addition, data and control NDMP connections and any I/O handles are not affected.

Figure 5:
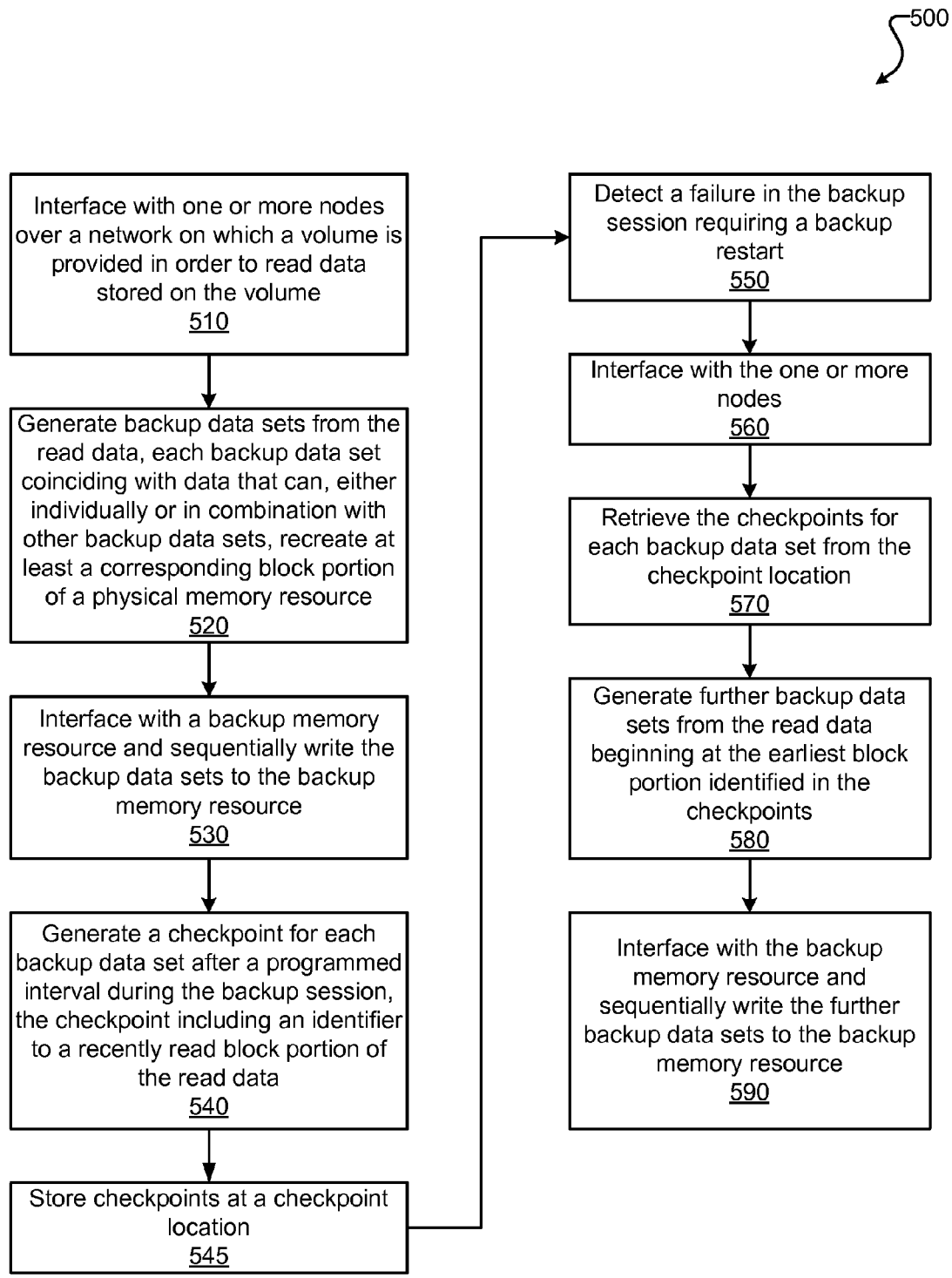
FIG. 5 illustrates an example method of performing a block-based backup restart, in accordance with a first mode of operation.

FIG. 5 illustrates an example method 500 of performing a block-based backup restart, in accordance with a first mode of operation. In this mode of operation, a backup session restart is performed after a failure without the failure and restart being detected by the backup manager, such as data management application 115 as illustrated in FIG. 1.

In an aspect, a data storage system performs operations that include interfacing with one or more nodes over a network on which a volume is provided in order to read data stored on the volume (510). Rather than reading file-by-file, the system reads from the volume on a block-by-block basis. Backup data sets (e.g., ReplOps) capable of recreating the data on the volume are generated from the data blocks read from the volume (520).

The system can interface with a backup memory resource and write the backup data sets to the backup memory resource in a sequential order (530). In one aspect, there is only one node and one data set backed up from the volume. In other aspects, the volume is distributed across multiple nodes over a network and each node generates its own backup data set which can be combined with the other nodes' backup data sets to recreate the data stored on the volume.

In one aspect, the backup memory resource is a tape device or tape library in which data is read and written in a linear order. In other aspects, the backup memory resource is a cloud storage platform located on a remote host and the data sets are transmitted across a network in the sequential order.

As the backup data sets are generated and written to the backup memory resource, restart checkpoints for each data set are also regularly generated (540). In one aspect, these checkpoints are created after a fixed period of time such as every 30 seconds. In other aspects, checkpoints can be created after a specified number of blocks have been read from the volume. These checkpoints can then be stored at a checkpoint location such as checkpoint store 123.

During the data backup process, the system can detect various data transfer failures, both restartable and non-restartable. At the end of the failed transfer, the data backup engine 121 receives an error code from the block transfer engine 240 and determines whether the code indicates a fatal, non-restartable error or not. Examples of non-restartable errors are errors in media and explicit aborts. Examples of restartable errors include volume access errors, file system errors, and data marshalling errors.

If a failure in the backup session is recoverable, the system can attempt to trigger a backup restart (550). In some aspects, the backup restart is a new transfer with the same volumes and other parameters except with a new transfer id. When writing backup data sets to a tape device, the tape may be left in its last position before the failure and resume writing where it left off. In some aspects, the backup data sets are idempotent (that is, they can be applied to the destination volume any number of times without changing the result), and therefore multiple copies of the same backup data set can be written to the tape device without harm.

In one aspect, the system interfaces with the one or more nodes (560) on which the volume is provided and retrieves stored checkpoints for each backup data set from the checkpoint location (570). Rather than generating backup data sets from the starting block of the volume, the nodes can restart the backup session and generate backup data sets beginning at a block identified in the stored checkpoint. In some aspects, when there are multiple checkpoints stored at the checkpoint location, the checkpoint referring to the earliest block is used (580).

The system can then interface with the backup memory resource 160 again and continue writing backup data sets to the backup memory 160 resource in a sequential order (590).

Figure 6:
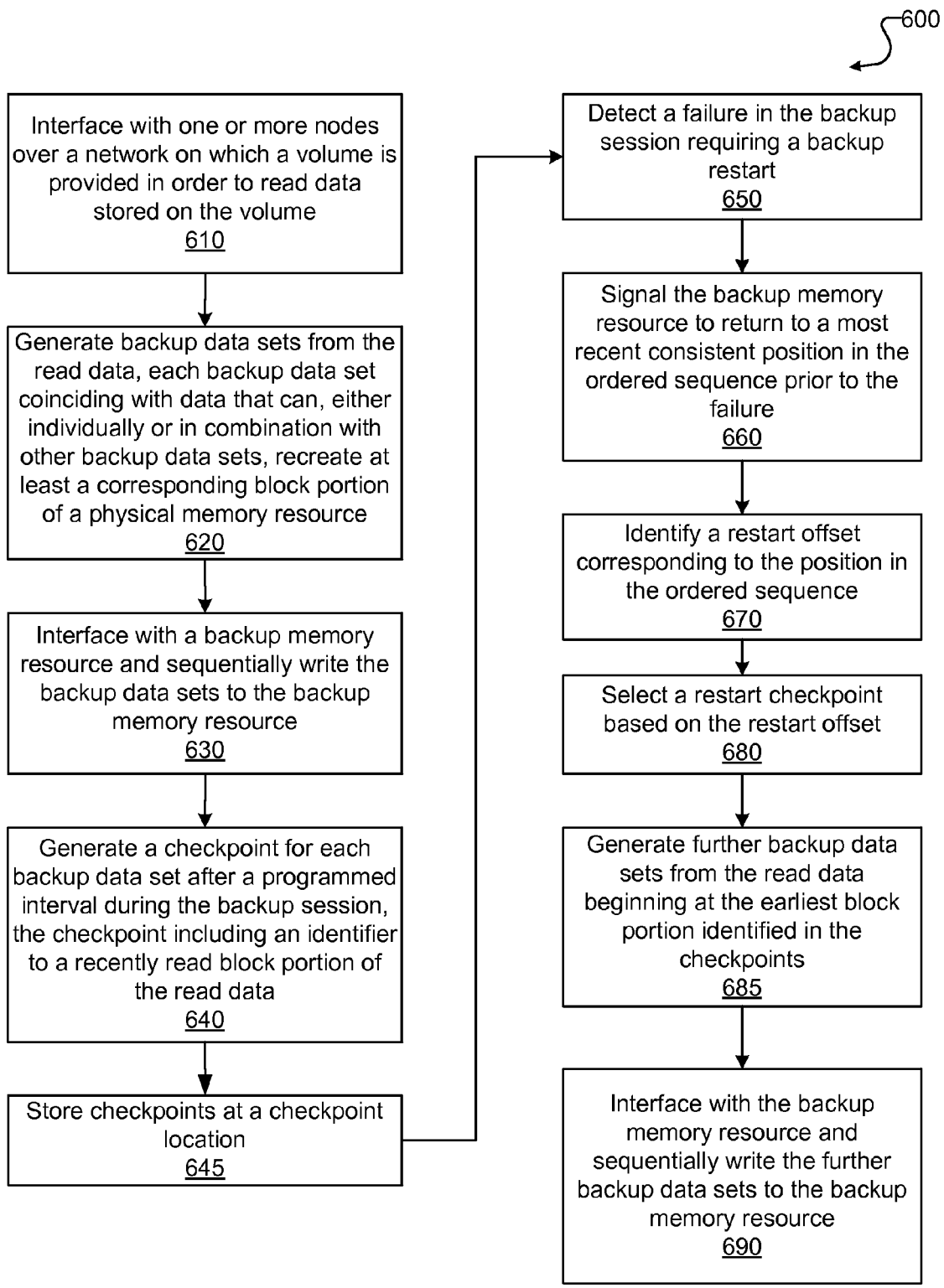
FIG. 6 illustrates an example method of performing a block-based backup restart, in accordance with a second mode of operation.

FIG. 6 illustrates an example method 600 of performing a block-based backup restart, in accordance with a second mode of operation. In this mode of operation, a backup session restart is performed after a failure with the assistance of the backup session manager, such as data management application 115 as illustrated in FIG. 1.

In an aspect, a data storage system performs operations that include interfacing with one or more nodes over a network on which a volume is provided in order to read data stored on the volume (610). Rather than reading file-by-file, the system reads from the volume on a block-by-block basis.

Backup data sets (e.g., ReplOps) capable of recreating the data on the volume are generated from the data blocks read from the volume (620).

The system can interface with a backup memory resource and write the backup data sets to the backup memory resource in a sequential order (630). In one aspect, there is only one node and one data set backed up from the volume. In other aspects, the volume is distributed across multiple nodes over a network and each node generates its own backup data set which can be combined with the other nodes' backup data sets to recreate the data stored on the volume.

In one aspect, the backup memory resource is a tape device or tape library in which data is read and written in a sequential order. In other aspects, the backup memory resource is a cloud storage platform located on a remote host and the data sets are transmitted across a network in the sequential order.

As the backup data sets are generated and written to the backup memory resource, restart checkpoints for each data set are also regularly generated (640). In one aspect, these checkpoints are created after a fixed period of time such as every 30 seconds. In other aspects, checkpoints can be created after a specified number of blocks have been read from the volume. These checkpoints can then be stored at a checkpoint location such as with the source storage system associated with the volume being backed up (645). Additionally, the data management application 115 can store a mapping of positions in the data backup stream to positions in the backup memory resource 160 where corresponding data from the stream is written.

During the data backup process, the system can detect various data transfer failures, both restartable and non-restartable. At the end of the failed transfer, the data backup engine 121 receives an error code from the block transfer engine 240 and determines whether the code indicates a fatal, non-restartable error or not. Examples of non-restartable errors are errors in media and explicit aborts. Examples of restartable errors in this mode of operation are network errors and disruptions in the storage system.

If a failure in the backup session is recoverable, the system can attempt to trigger a backup restart (650). In this mode of operation, a backup session restart is performed with the assistance of the backup session manager, such as data management application 115 as illustrated in FIG. 1. Data management application 115 reconnects to the source storage system 120 and the backup memory resource 160 in order to reestablish the connection between source and destination.

Once the connection has been reestablished, the data management application 115 can signal the backup memory resource 160 to reposition itself to the last consistent position recorded, which may represent the last known good write before the failure occurred (660). In one aspect, this involves repositioning the writing mechanism of a magnetic tape in a tape device. In other aspects, repositioning refers to a sequential stream of bytes being sent over a network, for example to a cloud storage system.

Once repositioned, the data management application 115 can identify a data restart offset which corresponds to the identified last consistent position of the backup memory resource 160 (670). This restart offset 118 and a backup context identifying the backup session can be sent to the source storage system 120 along with a DMA command 116 to restart the backup session.

Data backup engine 121 receives the restart backup request and looks up a checkpoint file using the restart offset 118 provided by the data management application 115. In one aspect, this lookup is performed on a file on the source storage system 120 that contains a table mapping data offsets to checkpoints for each backup session. The data backup engine 121 selects a checkpoint with an offset that is closest to but less than the reset offset 118 (680).

Rather than generating backup data sets from the starting block of the volume, the data backup engine 121 can restart the backup session and generate backup data sets beginning at a block identified in the selected checkpoint (685). The system can then interface with the backup memory resource 160 again and continue writing backup data sets to the backup memory resource 160 in a sequential order (590).

Figure 7:
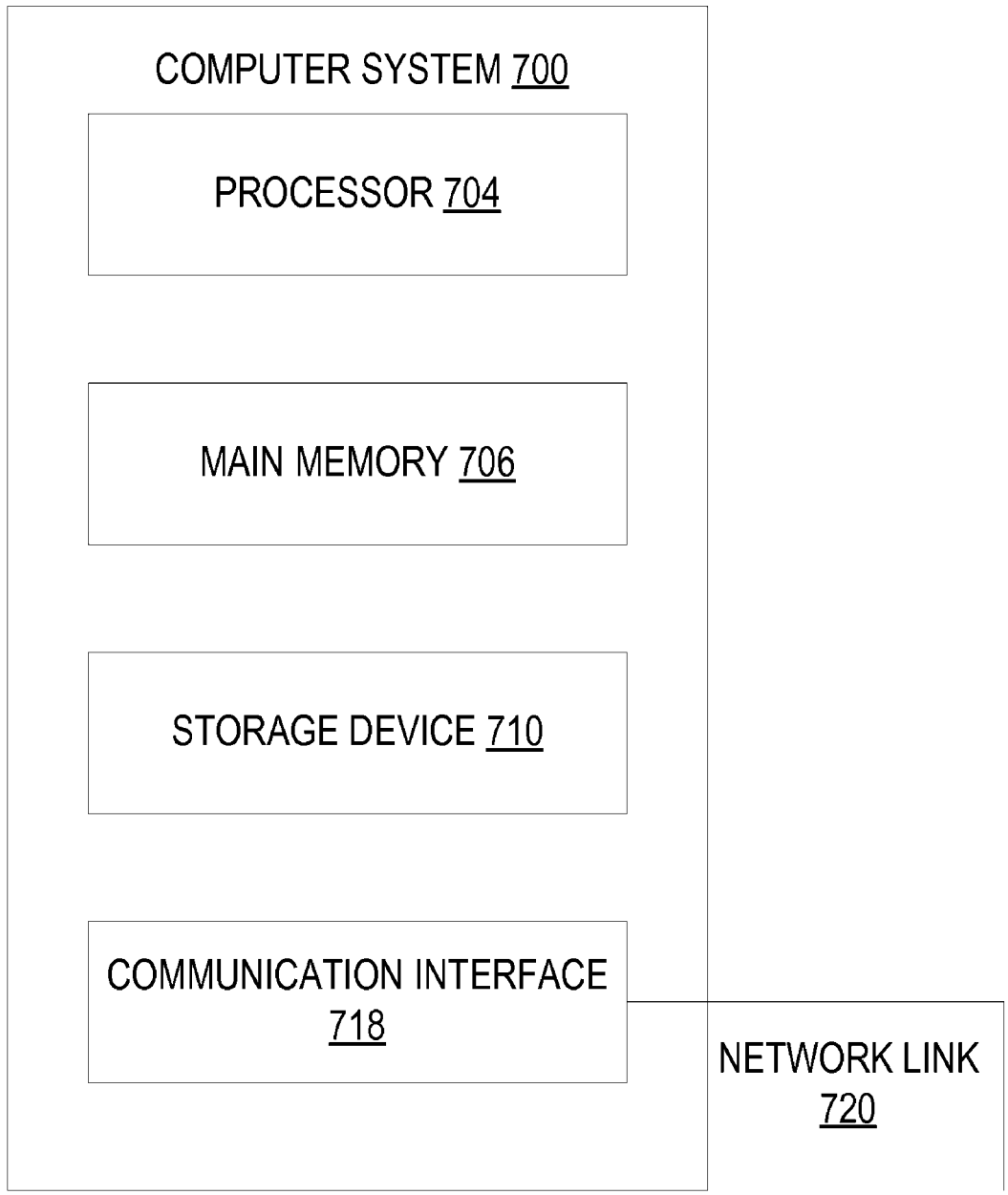
FIG. 7 is a block diagram that illustrates a computer system upon which embodiments described herein may be implemented.

FIG. 7 is a block diagram that illustrates a computer system upon which embodiments described herein may be implemented. For example, in the context of FIG. 1, data backup system 100 may be implemented using one or more servers such as described by FIG. 7.

In an embodiment, computer system 700 includes processor 704, memory 706 (including non-transitory memory), storage device 710, and communication interface 718. Computer system 700 includes at least one processor 704 for processing information. Computer system 700 also includes the main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) or other static storage device for storing static information and instructions for processor 704. The storage device 710, such as a magnetic disk or optical disk, is provided for storing information and instructions. The communication interface 718 may enable the computer system 700 to communicate with one or more networks through use of the network link 720 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Embodiments described herein are related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method comprising:
    reading, by a storage server implementing a backup session, data at a physical block level from a volume associated with one or more nodes of a network;
    generating backup data sets from read data read from the volume;
    writing the backup data sets to a backup memory resource in an ordered sequence;
    generating a plurality of checkpoints for the backup data sets, wherein a checkpoint, comprising an identifier of a latest block number of the read data read from the volume for writing to the backup memory resource, is generated after a programmed interval during the backup session;
    storing the plurality of checkpoints within a checkpoint location; and
    performing a backup restart in response to detecting a failure in the backup session, wherein the performing a backup restart comprises:
        retrieving the plurality of checkpoints from the checkpoint location;
        selecting a restart checkpoint from the plurality of checkpoints; and
        restarting the backup session to generate additional backup data sets from the read data beginning at a block identified by the restart checkpoint.

2. The method of claim 1, wherein the performing a backup restart comprises:
    signaling the backup memory resource to return to a most recent consistent position in the ordered sequence of the backup data sets written to the backup memory resource prior to the failure.

3. The method of claim 2, wherein the selecting a restart checkpoint comprises:
    determining that the restart checkpoint comprises a restart offset closest to but less than a data offset corresponding to the most recent consistent position in the ordered sequence of the backup data sets written to the backup memory resource.

4. The method of claim 1, wherein the programmed interval corresponds to a number of blocks of data.

5. The method of claim 1, wherein the performing a backup restart comprises:
    sequentially writing the additional backup data sets to the backup memory resource.

6. The method of claim 5, wherein the volume is distributed across a first node and a second node.

7. The method of claim 6, wherein the generating backup data sets comprises:
    generating a first backup data set from first read data read from a first portion of the volume accessible from the first node; and
    generating a second backup data set from second read data read from a second portion of the volume accessible from the second node.

8. The method of claim 1, wherein the generating backup data sets comprises:
    backing up deduplication information for the volume.

9. The method of claim 1, comprising:
    maintaining a table that maps data offsets to checkpoints for the backup session; and
    performing a lookup to the table to identify the restart checkpoint.

10. The method of claim 1, wherein the latest block number comprises a virtual block number mapping to a physical block number on the volume.

11. The method of claim 1, wherein the checkpoint comprises a progress indicator indicative of a state of completion of the backup session.

12. The method of claim 11, wherein the progress indicator is a percentage of total blocks of the volume that have been transferred to the backup memory resource.

13. The method of claim 11, wherein the progress indicator is a number of bytes of the volume transferred to the backup memory resource.

14. The method of claim 1, comprising:
compressing the backup data sets before writing the backup data sets to the backup memory resource.

15. A non-transitory machine-readable medium having stored thereon instructions for performing a method that causes a machine to:
read data at a physical block level from a volume associated with one or more nodes of a network;
generate backup data sets from read data read from the volume;
write the backup data sets to a backup memory resource in an ordered sequence;
generate a plurality of checkpoints for the backup data sets, wherein a checkpoint, comprising an identifier of a latest block number of the read data read from the volume for writing to the backup memory resource, is generated after a programmed interval during a backup session;
store the plurality of checkpoints within a checkpoint location; and
perform a backup restart in response to detecting a failure in the backup session, comprising:
retrieve the plurality of checkpoints from the checkpoint location;
select a restart checkpoint from the plurality of checkpoints; and
restart the backup session to generate additional backup data sets from the read data beginning at a block identified by the restart checkpoint.

16. A computing device comprising:
a memory containing a machine-readable medium comprising instructions for performing a method; and
a processor coupled to the memory, the processor configured to execute the instructions to cause the processor to:
read data at a physical block level from a volume associated with one or more nodes of a network;
generate backup data sets from read data read from the volume;
write the backup data sets to a backup memory resource in an ordered sequence;
generate a plurality of checkpoints for the backup data sets, wherein a checkpoint, comprising an identifier of a latest block number of the read data read from the volume for writing to the backup memory resource, is generated after a programmed interval during a backup session;
store the plurality of checkpoints within a checkpoint location; and
perform a backup restart in response to detecting a failure in the backup session, comprising:
retrieve the plurality of checkpoints from the checkpoint location;
select a restart checkpoint from the plurality of checkpoints; and
restart the backup session to generate additional backup data sets from the read data beginning at a block identified by the restart checkpoint.

17. The computing device of claim 16, wherein the instructions cause the processor to:
signal the backup memory resource to return to a most recent consistent position in the ordered sequence of the backup data sets written to the backup memory resource prior to the failure.

18. The computing device of claim 17, wherein the instructions cause the processor to:
determine that the restart checkpoint comprises a restart offset closest to but less than a data offset corresponding to the most recent consistent position in the ordered sequence of the backup data sets written to the backup memory resource.

19. The computing device of claim 16, wherein the programmed interval corresponds to a number of blocks of data.

20. The computing device of claim 16, wherein a backup data set comprises data used to recreate a corresponding block portion of a physical memory resource.

* * * * *